(12) United States Patent
Murase et al.

(10) Patent No.: US 8,928,281 B2
(45) Date of Patent: Jan. 6, 2015

(54) BATTERY CONTROL APPARATUS, VEHICLE, AND BATTERY CONTROL METHOD

(75) Inventors: Hiroaki Murase, Tokyo (JP); Kazuhiro Muto, Chiba (JP)

(73) Assignees: ITOCHU Corporation, Osaka (JP); The Japan Research Institute, Limited, Tokyo (JP)

( * ) Notice: Subject to any disclaimer, the term of this patent is extended or adjusted under 35 U.S.C. 154(b) by 57 days.

(21) Appl. No.: 13/239,390

(22) Filed: Sep. 22, 2011

(65) Prior Publication Data

US 2012/0013304 A1 Jan. 19, 2012

Related U.S. Application Data

(63) Continuation of application No. PCT/JP2010/002136, filed on Mar. 25, 2010.

(30) Foreign Application Priority Data

Mar. 27, 2009 (JP) ................. 2009-080618

(51) Int. Cl.
```
H02J 7/00      (2006.01)
B60L 11/18     (2006.01)
H01M 2/20      (2006.01)
H01M 10/44     (2006.01)
H01M 10/48     (2006.01)
H01M 6/42      (2006.01)
```

(52) U.S. Cl.
CPC ............ *H02J 7/0013* (2013.01); *B60L 11/1864* (2013.01); *H01M 2/202* (2013.01); *H01M 10/441* (2013.01); *H01M 10/482* (2013.01); *H01M 6/42* (2013.01); *Y02T 10/7005* (2013.01); *Y02T 10/7055* (2013.01); *Y02T 10/7061* (2013.01)
USPC .......................................... 320/116; 320/122

(58) Field of Classification Search
CPC ....... Y02E 60/12; H02J 7/0016; H02J 7/0021
USPC .................................................. 320/116, 122
See application file for complete search history.

(56) References Cited

U.S. PATENT DOCUMENTS 5,894,212 A * 4/1999 Balogh ......................... 320/122
6,127,806 A * 10/2000 Tanjo et al. ................... 320/132

(Continued)

FOREIGN PATENT DOCUMENTS

| JP | H08-289479 A | 11/1996 |
|----|-------------|---------|
| JP | H08-308122 A | 11/1996 |

(Continued)

OTHER PUBLICATIONS

English Translation of JP 08-289479 to Unisia Jecs Corp.*

(Continued)

*Primary Examiner* — Drew A Dunn
*Assistant Examiner* — Nathaniel Pelton

(57) ABSTRACT

A battery control apparatus includes: a battery circuit in which a plurality of batteries are connected in series; a plurality of bypass circuits, each of which removes a corresponding battery from the battery circuit; a plurality of switches, each of which switches whether to connect a corresponding battery in series with the other batteries, or to connect the corresponding battery to a corresponding bypass circuit to remove the corresponding battery from the battery circuit; a deterioration detecting section that detects deterioration of each of the plurality of batteries; and a switch control section that controls the plurality of switches to remove, from the battery circuit, the batteries having greater deterioration and connects, in series, the batteries having smaller deterioration.

10 Claims, 4 Drawing Sheets

(56) References Cited

U.S. PATENT DOCUMENTS

| | | | |
|---|---|---|---|
| 7,211,987 B2* | 5/2007 | Aoki et al. | 320/134 |
| 7,564,216 B2* | 7/2009 | Carrier et al. | 320/116 |
| 7,626,394 B2* | 12/2009 | Kimura et al. | 324/427 |
| 7,863,775 B2* | 1/2011 | Oh | 307/66 |
| 2001/0011881 A1* | 8/2001 | Emori et al. | 320/116 |
| 2007/0188138 A1* | 8/2007 | Kobayashi | 320/119 |
| 2008/0285193 A1* | 11/2008 | Watanabe et al. | 361/88 |

FOREIGN PATENT DOCUMENTS

| | | |
|---|---|---|
| JP | H09-035760 A | 2/1997 |
| JP | H10-108360 A | 4/1998 |
| JP | H11-185832 A | 7/1999 |
| JP | 2000-149999 A | 5/2000 |
| JP | 3279071 B2 | 4/2002 |
| JP | 2003-111204 A | 4/2003 |
| JP | 2003-274566 A | 9/2003 |
| JP | 2005-302337 A | 10/2005 |
| JP | 2006-238619 A | 9/2006 |
| JP | 2006-246595 A | 9/2006 |
| JP | 3976268 B2 | 9/2007 |
| JP | 4033130 B2 | 1/2008 |
| JP | 2008-288109 A | 11/2008 |

OTHER PUBLICATIONS

International Search Report for International application No. PCT/JP2010/002136, mailed on Jun. 15, 2010.
English translation of Written Opinion (IB338) for International application No. PCT/JP2010/002136, mailed on Nov. 24, 2011.
Notice of Reasons for Refusal for Japanese Patent Application No. 2009-080618, issued by the Japanese Patent Office on Jul. 23, 2013.

* cited by examiner

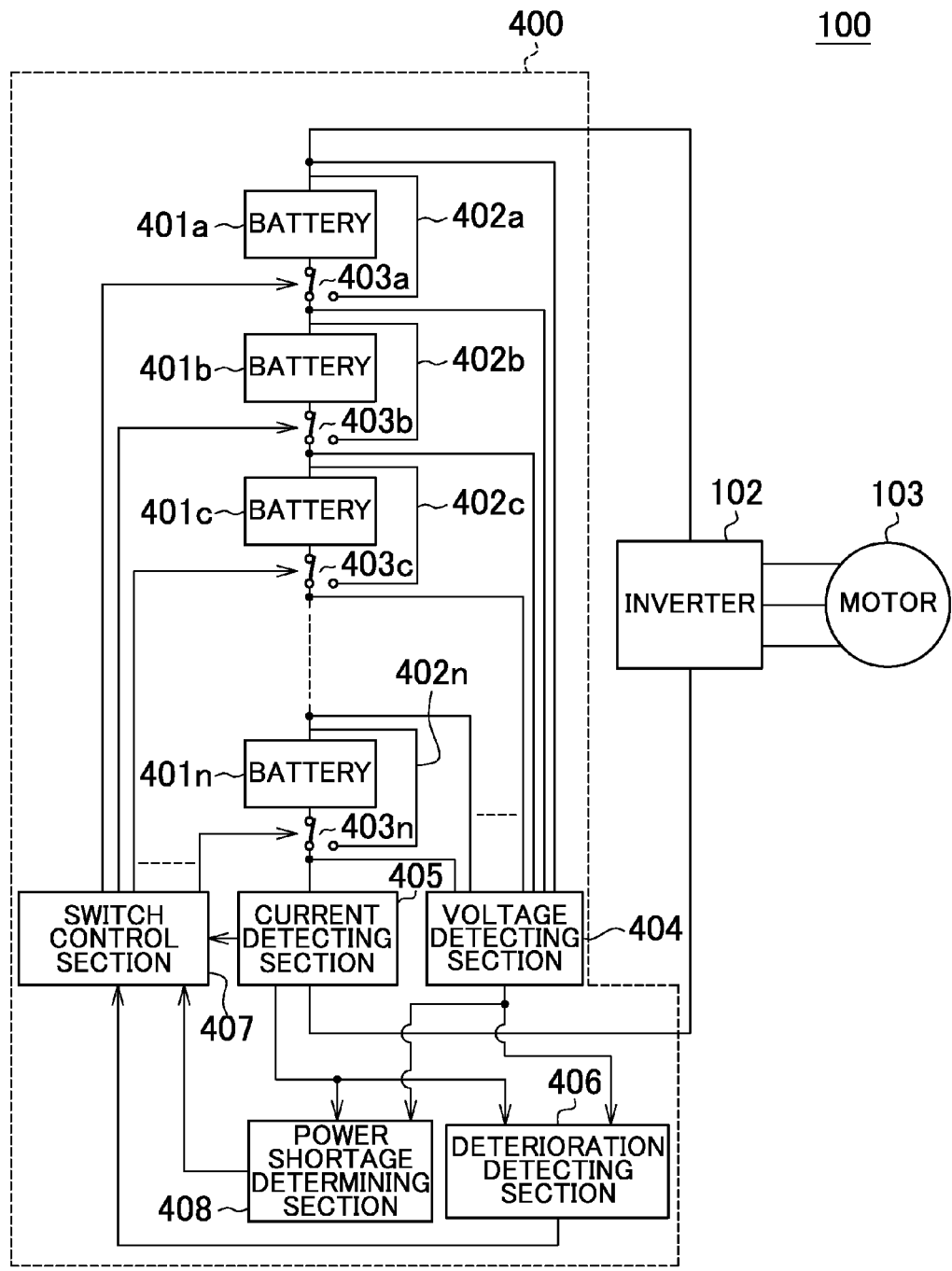
F I G. 4

BATTERY CONTROL APPARATUS, VEHICLE, AND BATTERY CONTROL METHOD

The contents of the following International patent application are incorporated herein by reference:
International Patent Application NO. PCT/JP2010/002136 filed on Mar. 25, 2010.

BACKGROUND

1. Technical Field

The present invention relates to a battery control apparatus, a vehicle, and a battery control method, according to which batteries having minor deterioration are used prior to batteries having major deterioration.

2. Related Art

Conventionally, a technique of removing, from a battery circuit, battery modules in which fault has been found has been known.

Patent Document No. 1: Japanese Patent Application Publication No. 2008-288109
Patent Document No. 2: Japanese Patent Application Publication No. 2006-238619
Patent Document No. 3: Japanese Patent No. 3976268
Patent Document No. 4: Japanese Patent Application Publication No. 2006-246595
Patent Document No. 5: Japanese Patent No. 3279071
Patent Document No. 6: Japanese Patent Application Publication No. 2000-149999
Patent Document No. 7: Japanese Patent Application Publication No. 2003-111204
Patent Document No. 8: Japanese Patent Application Publication No. 2005-302337
Patent Document No. 9: Japanese Patent No. 4033130
Patent Document No. 10: Japanese Patent Application Publication No. H9-35760
Patent Document No. 11: Japanese Patent Application Publication No. H8-308122
Patent Document No. 12: Japanese Patent Application Publication No. H11-185832

SUMMARY

Removal of batteries when found a fault therein does not help improve the efficiency of the battery circuit, because batteries of different degrees of deterioration are connected in the battery circuit.

Therefore, according to a first aspect of the innovations herein, provided is a battery control apparatus including: a battery circuit in which a plurality of batteries are connected in series; a plurality of bypass circuits, each of which removes a corresponding battery from the battery circuit; a plurality of switches, each of which switches whether to connect a corresponding battery in series with the other batteries, or to connect the corresponding battery to a corresponding bypass circuit to remove the corresponding battery from the battery circuit; a deterioration detecting section that detects deterioration of each of the plurality of batteries; and a switch control section that controls the plurality of switches to remove, from the battery circuit, the batteries having greater deterioration and connects, in series, the batteries having smaller deterioration.

The battery control apparatus may further include a voltage detecting section that detects the voltage of the battery circuit, where when the voltage of the battery circuit becomes a predetermined value or less, the switch control section controls the plurality of switches to connect, in series, the batteries removed from the battery circuit.

The switch control section may control the plurality of switches to connect in series, the batteries, from among the plurality of batteries, whose difference in deterioration from the battery having the smallest deterioration is a predetermined value or less, and to remove, from the battery circuit, the batteries whose difference in deterioration from the battery having the smallest deterioration exceeds the predetermined value.

The battery control apparatus may include a current detecting section that detects the current of the battery circuit, where the switch control section controls the plurality of switches to sequentially connect each of the plurality of batteries in series, and to remove the batteries other than the batteries connected in series, from the battery circuit, the current detecting section detects the current flowing from each of the plurality of batteries by detecting the current of the battery circuit, and the deterioration detecting section detects deterioration of each of the plurality of batteries, from the current flowing from the battery.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 4 shows an example of a vehicle 100 equipped with another battery control apparatus 400.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
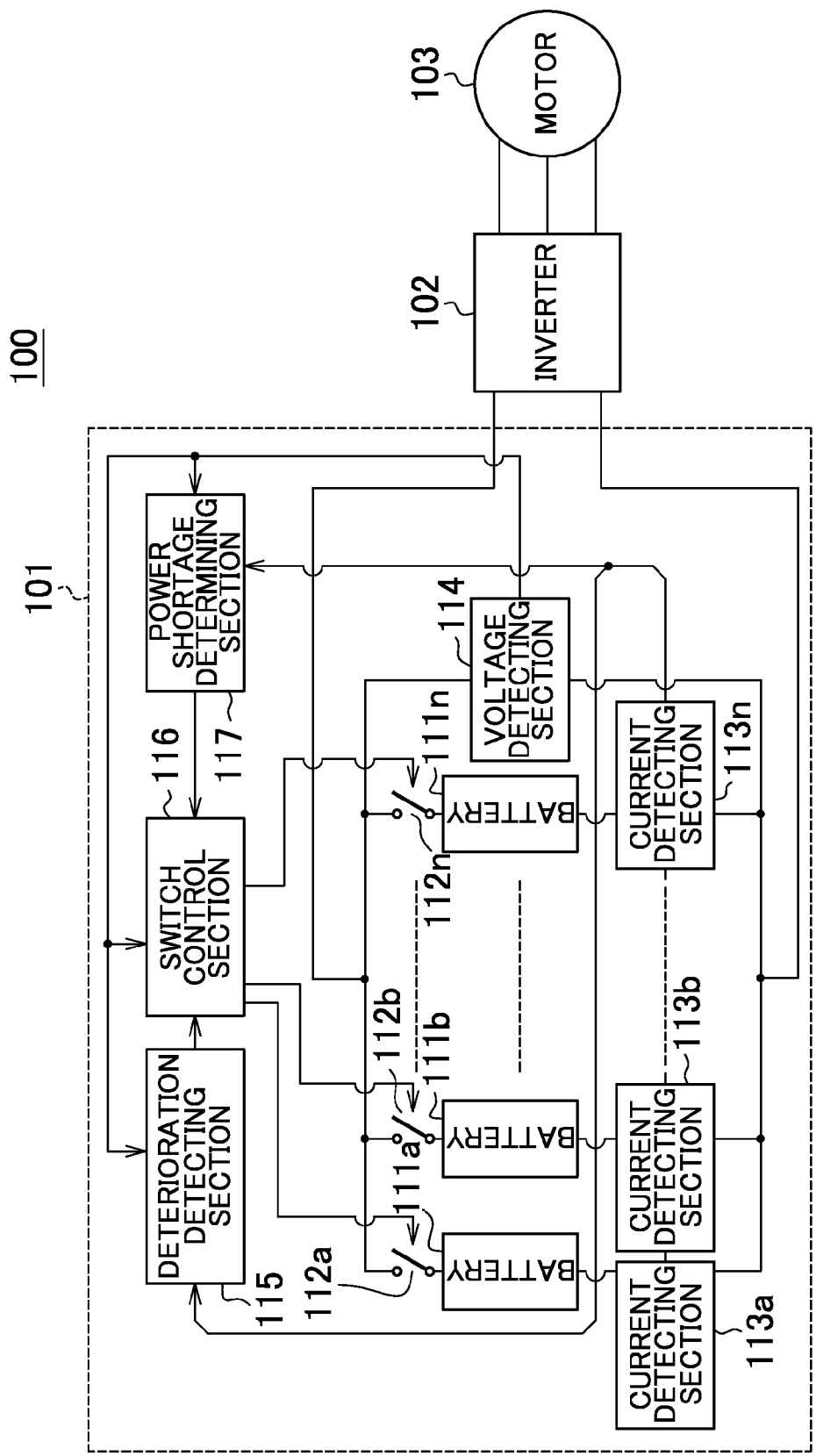
FIG. 1 shows an exemplary vehicle 100.

FIG. 1 shows an exemplary vehicle 100. The vehicle 100 includes a battery control apparatus 101, an inverter 102, and a motor 103. The battery control apparatus 101 includes a plurality of batteries 111, a plurality of switches 112, a plurality of current detecting sections 113, a voltage detecting section 114, a deterioration detecting section 115, a switch control section 116, and a power shortage determining section 117. The vehicle may be an electric car.

The plurality of batteries 111 are connected in parallel. A battery circuit is constituted by the plurality of batteries 111 in parallel connection. The battery circuit is a circuit in which batteries 111 that can supply power to a load are connected, and can also be referred to as "assembled battery." The plurality of switches 112 can disconnect, from the battery circuit, each of the plurality of batteries 111 connected in parallel. Concretely, the batteries 111 and the switches 112 are connected in series, such that a battery 111a and a switch 112a are serially connected and a battery 111b and a switch 112b are serially connected. Accordingly, a switch 112 can disconnect and connect between the corresponding battery 111 and the battery circuit. In the present application, such expression as "a battery 111 corresponding to a switch 112" indicates a battery 111 in serial connection with the particular switch 112.

The plurality of current detecting sections 113 detect the current of each battery 111. That is, the plurality of current detecting sections 113 detect the current flowing from each battery 111. More specifically, the batteries 111 and the current detecting sections 113 are connected in series, such that a battery 111a and a current detecting section 113a are serially connected and a battery 111b and a current detecting section 113b are serially connected. Accordingly, a current detecting section 113 can detect the current flowing from the corresponding battery 111. In the present application, such expression as "a battery 111 corresponding to a current detecting section 113" indicates a battery 111 in serial connection with the particular current detecting section 113. The plurality of current detecting sections 113 output the electric-current values of the batteries 111 having been detected, to the deterioration detecting section 115 and the power shortage determining section 117.

The voltage detecting section 114 detects the voltage of the battery circuit. The voltage detecting section 114 outputs the detected voltage value of the battery circuit, to the deterioration detecting section 115 and the power shortage determining section 117. The deterioration detecting section 115 detects the deterioration of each of the plurality of batteries 111. The deterioration detecting section 115 detects the deterioration of each of the plurality of batteries 111, from at least one of the voltage and the current of each of the plurality of batteries 111. The deterioration detecting section 115 may detect, as the deterioration, at least one of the internal resistance value of the battery 111, the number of times of charge/discharge of the battery 111, the charge start voltage of the battery 111, the charge completion voltage of the battery 111, the charge curve of the battery 111, and the deterioration curve of the battery 111. In the present embodiment, the deterioration detecting section 115 detects the internal resistance value of the battery 111. The deterioration of the battery 111 detected by the deterioration detecting section 115 is outputted to the switch control section 116. The deterioration detecting section 115 outputs, to the switch control section 116, the deterioration value representing the detected degree of deterioration. A greater deterioration value indicates progress of deterioration. If the internal resistance value is detected as the deterioration, the deterioration detecting section 115 may use the internal resistance value as the deterioration value as it is.

The switch control section 116 controls the plurality of switches 112. The switch control section 116 controls the switches 112 to connect each battery 111 to the battery circuit, or to disconnect each battery 111 from the battery circuit. The switch control section 116 controls the switches 112 to disconnect batteries having greater deterioration from the battery circuit. Accordingly, the batteries 111 connected to the battery circuit have smaller deterioration. This makes it possible to use from the batteries 111 having smaller deterioration prior to the batteries 111 having greater deterioration. In addition, the progress of the deterioration of the batteries 111 having greater deterioration can be restrained. The usage of the batteries 111 is a concept that includes both of discharge and charge.

The switch control section 116 controls the switches 112 to connect, to the battery circuit, battery(ies) 111, from among the plurality of batteries 111, whose difference in deterioration from a battery 111 having the smallest deterioration is a predetermined value or less, and to disconnect batteries whose difference in deterioration from the battery 111 having the smallest deterioration exceeds the predetermined value. Specifically, battery(ies) 111 whose difference in internal resistance value from the battery 111 having the smallest internal resistance value of all the plurality of batteries 111 is a predetermined value or less are connected to the battery circuit. Conversely, battery(ies) 111 whose difference in internal resistance value from the battery 111 having the smallest internal resistance value of all the plurality of batteries 111 exceeds the predetermined value are disconnected from the battery circuit.

When the voltage of the battery circuit becomes a predetermined value or less, the switch control section 116 controls the switches 112 to connect the batteries 111 having been disconnected from the battery circuit, back to the battery circuit again. The remaining battery amount of the battery circuit is proportional to the voltage of the battery circuit. That is, when the voltage of the battery circuit is lowered, the remaining battery amount of the battery circuit also decreases. Therefore, when the voltage of the battery circuit becomes a predetermined value or less, the remaining battery amount of the battery circuit can be recovered by connecting, back to the battery circuit again, the batteries 111 having great deterioration and having been disconnected from the battery circuit. In addition, when the voltage of the battery circuit becomes a predetermined value or less, the switch control section 116 may control the switches 112 to connect the batteries 111 having been disconnected from the battery circuit back to the battery circuit again, and disconnect the batteries 111 having been connected to the battery circuit, from the battery circuit. The reason for disconnecting the batteries 111 having been connected to the battery circuit from the battery circuit is that the batteries 111 having been connected to the battery circuit have a small remaining battery amount, although having smaller deterioration.

The switch control section 116 controls the switches 112 to sequentially connect each of the plurality of batteries 111 to the battery circuit, and to bring the batteries 111 other than the connected batteries 111, in the state disconnected from the battery circuit. Specifically, the switch control section 116 controls the switch 112a to connect the battery 111a to the battery circuit, and disconnect the other batteries 111 from the battery circuit. Next, the switch control section 116 controls the switch 112a to disconnect the battery 111a as well as controlling the switch 112b to connect the battery 111b to the battery circuit. Here, the battery 111b is connected to the battery circuit, and the other batteries 111 are disconnected from the battery circuit. In this way, each of the batteries 111 is sequentially connected to the battery circuit, while the other batteries 111 are disconnected from the battery circuit. In this example, because each battery 111 is sequentially connected to the battery circuit, the voltage detecting section 114, which detects the voltage of the battery circuit, can detect the voltage of each battery 111.

The switch control section 116 may perform the operation of sequentially connecting each of the plurality of batteries 111 to the battery circuit while disconnecting the other batteries 111 from the battery circuit, at the charge start, the charge completion, the stopping of the vehicle 100, or the parking of the vehicle 100, to enable the voltage detecting section 114 to detect the voltage of each battery 111. The switch control section 116 may perform the operation of sequentially connecting each of the plurality of batteries 111 to the battery circuit while disconnecting the other batteries 111 from the battery circuit, while the battery circuit is not supplying the power to the motor 103. The switch control section 116 may perform the operation of sequentially connecting each of the plurality of batteries 111 to the battery circuit while disconnecting the other batteries 111 from the battery circuit, while the battery circuit is not supplying the power to a power load. Since the voltage of the battery 111 is detected while not supplying power to the load, the accurate voltage of the battery 111 can be measured.

The inverter 102 converts a direct current supplied from the battery circuit to an alternate current. The inverter 102 supplies the resulting alternate current to the motor 103. The motor 103 drives the wheel of the vehicle 100. The motor 103 changes the number or rotation depending on the acceleration of a user. When regenerative energy is generated due to the braking operation of the user, the motor 103 charges at least one of the plurality of batteries 111 with the regenerative energy via the inverter 102. In this way, the motor 103 also functions as a power generating section.

In the case where the batteries 111 are charged with the regenerative energy from the motor 103, when the batteries 111 having smaller deterioration connected to the battery circuit are fully charged, the switch control section 116 controls the switches 112 to connect, to the battery circuit, the batteries 111 having greater deterioration disconnected from the battery circuit, as well as disconnecting the batteries 111 having smaller deterioration connected to the battery circuit. In addition, in the case where the batteries 111 are charged with the regenerative energy from the motor 103, when the batteries 111 having greater deterioration are connected to the battery circuit, they may be disconnected from the battery circuit. In other words, it is possible to design so that batteries having greater deterioration be charged only when the batteries 111 having smaller deterioration have been fully charged. Also in the case where the batteries 111 are charged with the regenerative energy, when the batteries 111 having smaller deterioration are not connected to the battery circuit, they may be connected to the battery circuit. In other words, it is possible to design so that the batteries 111 having smaller deterioration be used prior to batteries 111 having greater deterioration.

The power shortage determining section 117 determines whether there will be shortage in power supplied to a load from the battery circuit. The power shortage determining section 117 determines whether there will be shortage in power, by determining whether the power that can be supplied to the load from the battery circuit is greater than the amount of power consumed by the load. The load may be a motor 103 or an air conditioner for example. The power consumption of the motor 103 changes depending on the number of rotations. The power consumption of the air conditioner also changes depending on the temperature settings or the like. The power shortage determining section 117 may calculate the power consumed by the load, according to the level of acceleration, the temperature settings, or the like. The power shortage determining section 117 may obtain the power that can be supplied to the load from the battery circuit, based on at least one of the voltage of the battery circuit and the current flowing from the battery circuit. Here, the current flowing from the battery circuit is the total of the electric-current values of the batteries connected to the battery circuit, detected by the plurality of current detecting section 113. In addition, the power shortage determining section 117 may obtain the power that can be supplied to the load from the battery circuit, based on at least one of the voltage of the battery 111 connected to the battery circuit and the current flowing from the battery 111. Here, the voltage of each of the plurality of batteries 111 can be detected according to the above-explained method.

When there is a shortage in power supplied to the load from the battery circuit, the switch control section 116 may control the switches 112 to connect the batteries 111 having greater deterioration disconnected from the battery circuit, to the battery circuit. Accordingly, the battery capacity of the battery circuit increases, to increase the power supplied to the load from the battery circuit.

The following explains the deterioration detection performed by the deterioration detecting section 115. The internal resistance value of the battery 111 can be calculated from the voltage and the current of the battery 111. The deterioration detecting section 115 may detect the internal resistance value of the battery 111, from the voltage and the current of the battery 111, having been detected. In addition, the deterioration detecting section 115 may periodically detect the internal resistance value of the battery 111, and record the history thereof. In addition, the number of times of charge/discharge of the battery 111 is counted 1 from one occasion of charge to the next discharge. Specifically, when the battery 1 is charged and is then discharge is performed from the battery 1, the number of times of charge/discharge of the battery 1 is 1. The number of times of charge/discharge may be counted from the history of the voltage or the history of the current. In addition, the deterioration detecting section 115 may detect the number of times of charge/discharge from the history of the voltage of the battery 111. In addition, the deterioration detecting section 115 may detect the number of times of charge/discharge from the current of the battery 111. As the number of times of charge/discharge increases, the deterioration progresses. In view of this, the deterioration value can be based on the number of times of charge/discharge.

The history of the voltage is the change in voltage of the battery 111 in the elapse of time. That is, the deterioration detecting section 115 can obtain the history of the voltage by recording the voltage of the battery 111 in each predetermined period. The history of the current is the change in current of the battery 111 in the elapse of time. That is, the deterioration detecting section 115 can obtain the history of the current by recording the current of the battery 111 in each predetermined period.

The charge start voltage of the battery 111 is a voltage of the battery 111 at the start of charging the battery 111. The deterioration detecting section 115 may record the history of the voltage value of the battery at the start of charging the battery 111, to detect the lowest charge start voltage. When the voltage of the battery 111 at the charge start is low, it means that the deterioration has progressed. The voltage at the charge start is the voltage remaining in the battery 111 as a result of the most recent discharge. In view of this, the deterioration value can be determined according to the charge start voltage. Note that the deterioration detecting section 115 may detect the number of times in which the detected charge start voltage is lower than a predetermined voltage. As the number of times in which the detected charge start voltage is lower than the predetermined voltage increases, it means that the deterioration has progressed. The predetermined voltage may be a voltage that causes overdischarge. In view of this, the deterioration value can be determined according to the number of times in which the detected charge start voltage is lower than the predetermined voltage.

The charge completion voltage of the battery 111 is the voltage of the battery 111 having been fully charged. The deterioration detecting section 115 may record the value representing the voltage of the battery 111 having been fully charged, to detect the most recent voltage. As the deterioration progresses, the voltage at the full charge decreases. In view of this, the deterioration value can be determined according to the voltage at the full charge. Note that the deterioration detecting section 115 may detect the number of times in which a higher voltage than the voltage at the full charge is detected. In other words, the number of overcharge can be detected. As the number of overcharge gets greater, it means that the deterioration has progressed.

The charge curve represents the relation between the voltage and the charging time, while charging the battery 111. The deterioration detecting section 115 may detect the charge curve from the value representing the voltage detected from the charge start to the charge completion. When the increase of the voltage of the battery 111 is high relative to the charging time, the deterioration of the battery 111 is small, and when the increase of the voltage of the battery 111 is low relative to the charging time, the deterioration of the battery 111 is great. In view of this, the deterioration value can be determined according to the level of this charge curve.

The deterioration curve represents the deterioration history of the battery 111. The deterioration curve may represent the transition of the voltage of the battery 111 when fully charged. The deterioration curve may represent the relation between the number of times of charge and the voltage of the battery 111 when fully charged. As the number of times in which the battery 111 is charged increases, the voltage of the battery 111 when fully charged decreases. In other words, as the deterioration progresses, the voltage of the battery 111 when fully charged decreases. The deterioration detecting section 115 may record the voltage of the battery 111 when fully charged and the number of times of charge so far, to detect the deterioration curve. The deterioration curve may be the change in internal resistance value of the battery 111. As the internal resistance in the battery 111 gets greater, the batter 111 starts deteriorating. The deterioration curve may represent the relation between the number of times of charge of the battery 111 and the internal resistance value. As the number of times in which the battery 111 is charged increases, the internal resistance in the battery 111 increases. In view of this, the deterioration value may be obtained depending on the deterioration curve. As the deterioration of the battery 111 tends to progress according to the temperature, the deterioration detecting section 115 may detect the deterioration of the battery 111 taking into consideration the temperature of the battery 111. In this case, the vehicle is equipped with a temperature sensor for detecting the temperature of each battery 111.

The following explains the operation of the vehicle 100 shown in FIG. 1. Specifically, the operation to supply power to the motor 103 from the battery circuit is explained. The switch control section 116 controls the switches 112 to disconnect the batteries 111 having greater deterioration from the battery circuit, as well as connecting the batteries 111 having smaller deterioration to the battery circuit. Specifically, the switch control section 116 uses the deterioration value of the plurality of batteries 111 detected by the deterioration detecting section 115, to connect, to the battery circuit, the battery(ies) 111 whose difference in deterioration from a battery 111 having the smallest deterioration is a predetermined value or less, and to disconnect the batteries whose difference in deterioration from the battery 111 having the smallest deterioration exceeds the predetermined value, from the battery circuit. Accordingly, the batteries 111 having smaller deterioration are connected to the battery circuit, and so can be used first. In other words, the power of the batteries 111 having smaller deterioration is supplied to the load such as a motor 103. This prevents frequent charging of the batteries 111 having greater deterioration, and delays the progress of the deterioration of the batteries 111 having greater deterioration. Moreover, the progress of the deterioration of all the batteries in the battery circuit as a whole can be showed down.

In addition, since the batteries 111 having smaller deterioration are not in parallel connection with the batteries 111 having greater deterioration, the efficiency of the battery circuit can improve. For example, when the batteries having smaller deterioration are connected in parallel with the batteries 111 having greater deterioration, discharge is conducted due to the batteries having greater deterioration, which cannot make full use of the batteries having smaller deterioration. In other words, this configuration prevents effective usage of the power accumulated in the batteries having smaller deterioration. Note that the switch control section 116 may perform the operation of controlling the switches 112 to sequentially disconnect the batteries 111 having greater deterioration from the battery circuit, as well as connecting the batteries 111 having smaller deterioration to the battery circuit, at predetermined periods. In addition, the switch control section 116 may perform the operation at the start or the end of using the vehicle 100. By performing the mentioned operation periodically, when the deterioration of the batteries 111 having smaller deterioration becomes substantially the same as the deterioration of the batteries 111 having greater deterioration, due to the more frequent usage of the battery 111 having smaller deterioration, the battery 111 having greater deterioration will be connected to the battery circuit.

In the following case, the batteries 111 having greater deterioration are connected to the battery circuit. For example, by discharging the batteries 111 having smaller deterioration first, the voltage of the batteries having smaller deterioration will be lowered. Accordingly, the voltage of the battery circuit also decreases. When the voltage of the battery circuit is or falls below a predetermined value, the switch control section 116 controls the switches 112 to connect, to the battery circuit, the batteries 111 having greater deterioration disconnected from the battery circuit, as well as disconnecting the batteries 111 having smaller deterioration connected to the battery circuit, from the battery circuit. As a result, the voltage of the battery circuit can be raised, as well as preventing the overdischarge from the batteries 111 having smaller deterioration. Note that when the batteries 111 having smaller deterioration are charged, the switch control section 116 can control the switches 112 to connect the batteries 111 having smaller deterioration to the battery circuit again, while disconnecting the batteries 111 having greater deterioration in the state, from the battery circuit. In other words, the batteries having greater deterioration are used as a backup power source.

In addition, for example when the power shortage determining section 117 determines that the power to be supplied to the load such as a motor 103 from the battery circuit will lack, the switch control section 116 controls the switches 112 to connect, to the battery circuit, the batteries 111 having greater deterioration disconnected from the battery circuit. Accordingly, the power shortage of the load can be resolved. That is, the batteries having greater deterioration are used as auxiliary batteries. Note that when the power of the batteries 111 having smaller deterioration are sufficient in supplying power to the load, the switch control section 116 controls the switches 112 to disconnect the batteries 111 having greater deterioration, from the battery circuit.

In addition, when the deterioration of the batteries 111 connected to the battery circuit becomes substantially the same as the deterioration of the batteries 111 having greater deterioration disconnected from the battery circuit, due to usage of the battery circuit, the switch control section 116 may control the switches 112 to connect the batteries 401 having greater deterioration to the battery circuit.

Next, the operation for charging the battery circuit with the regeneration energy from the motor 103 is explained. The switch control section 116 controls the switches 112 to disconnect the batteries 111 having greater deterioration from the battery circuit, as well as connecting the batteries 111 having smaller deterioration to the battery circuit. Accordingly, the batteries 111 having smaller deterioration will be used first. In other words, the batteries 111 having smaller deterioration are charged with regeneration energy. This prevents frequent charging of the batteries 111 having greater deterioration, and slows down the progress of the deterioration of the batteries 111 having greater deterioration. In addition, since the batteries 111 having smaller deterioration are not in parallel connection with the batteries 111 having greater deterioration, the efficiency of the battery circuit can improve. On the contrary, when the batteries having smaller deterioration are connected in parallel with the batteries 111 having greater deterioration, for example, discharge is conducted due to the batteries having greater deterioration, and so cannot make full use of the batteries having smaller deterioration and cannot fully charge the batteries having smaller deterioration.

According to the embodiment in the present invention, when the batteries having smaller deterioration are fully charged, the switch control section 116 controls the switches 112 to connect, to the battery circuit, the batteries 111 having greater deterioration disconnected from the battery circuit, as well as disconnecting the batteries 111 having smaller deterioration from the battery circuit. Accordingly, the number of times of charge for the batteries having greater deterioration can be decreased, as well as preventing the overcharge of the batteries having smaller deterioration. That is, the batteries 111 having greater deterioration are used as auxiliary batteries. Note that when supply of the regeneration energy from the motor 103 stops, the switch control section 116 controls the switches 112 to connect the batteries 111 having smaller deterioration to the battery circuit, as well as disconnecting the batteries 111 having greater deterioration from the battery circuit. When the batteries 111 having greater deterioration are fully charged, the switch control section 116 controls the switches 112 to disconnect the batteries 111 having greater deterioration, from the battery circuit. Here, all the batteries 111 are disconnected from the battery circuit.

The battery 111 in FIG. 1 may be a battery cell, or may be a battery module made by a plurality of battery cells in serial connection. A battery module may be constituted by a plurality of battery cells having substantially the identical degree of deterioration. In addition, a battery module made by recycling and disassembling battery modules or battery packs into each battery cell, and repacking the battery cells may be used as a battery 111.

Figure 2:
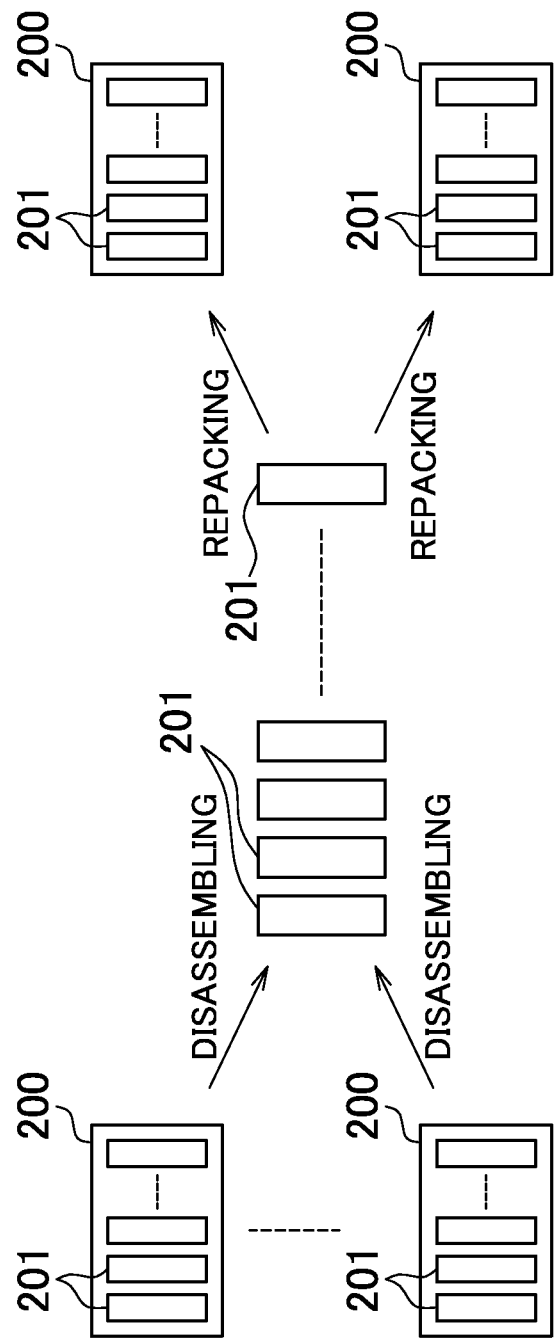
FIG. 2 shows an overview of repacking of battery cells.

FIG. 2 shows an overview of repacking of battery cells. The plurality of used battery modules 200 are disassembled into the unit of battery cell 201. In other words, the plurality of battery modules 200 are disassembled to obtain separate battery cells 201. Next, from among the plurality of separate battery cells 201, a group of battery cells 201 having substantially the identical deterioration are selected as battery cells to be assembled into a battery module. The selected battery cells 201 are assembled into a single battery module 200, to recreate the battery module 200. By assembling the plurality of battery cells 201 having substantially the identical deterioration into a battery module 200, the progress of deterioration of the battery module can be slowed down. When a group of battery cells 201 having substantially the identical deterioration into a battery module 200, the deterioration of each battery module 200 will be known. The deterioration detecting section 115 may store the deterioration of each battery module 200. In addition, it is possible to use used batteries as the batteries 111 having greater deterioration, and to use new batteries before usage may be used as the batteries 111 having smaller deterioration. This helps reduce the cost.

Figure 3:
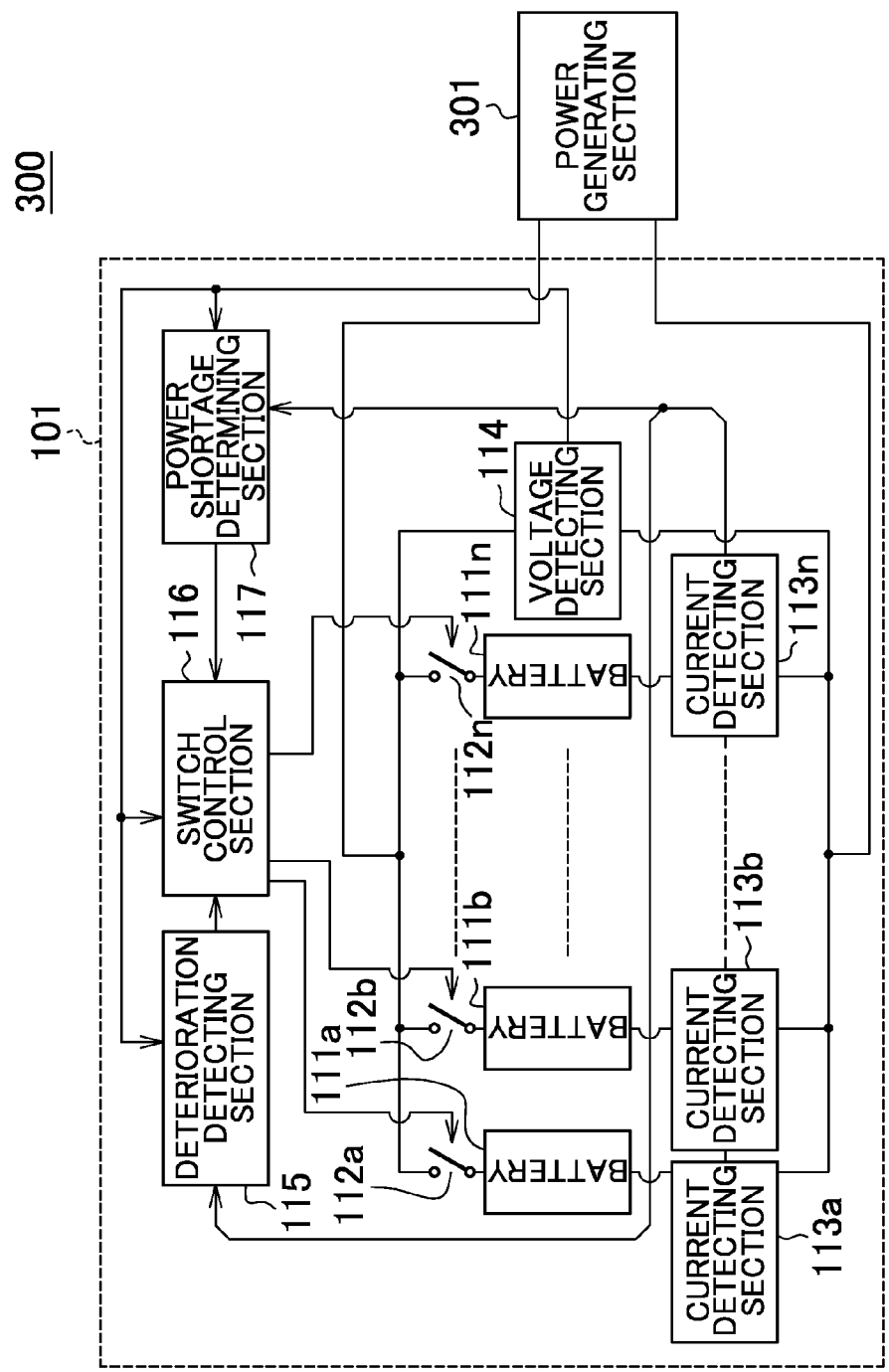
FIG. 3 shows an example of a power generating apparatus 300 including a battery control apparatus 101.

Although explained to be provided in the vehicle 100, the battery control apparatus 101 may be provided in the other apparatuses, appliances, or the like. FIG. 3 shows an example of a power generating apparatus 300 including a battery control apparatus 101. The power generating apparatus 300 includes a power generating section 301 in addition to the battery control apparatus 101. The power generating section 301 generates power. The power generating section 301 generates power to charge at least one of the plurality of batteries 111. The power generating section 301 may be a solar power generator generating power by solar light, or a wind power generator generating power by wind. The power generating section 301 may also be a fuel cell. A load which receives power from the battery circuit of the battery control apparatus 101 may be connected to the power generating section 301. The operation of the battery control apparatus 101 of the power generating apparatus 300 may be the same as the operation of the battery control apparatus 101 of the vehicle 100 shown in FIG. 1. Accordingly, in principle, the power generated by the power generating section 301 is used to charge the batteries 111 having smaller deterioration That is, the batteries 111 having smaller deterioration will be used first. The batteries having greater deterioration are used as a backup power source or an auxiliary battery.

FIG. 4 shows an example of a vehicle 100 equipped with another battery control apparatus 400. The vehicle 100 includes a battery control apparatus 400, an inverter 102, and a motor 103. For the explanation about the inverter 102 and the motor 103, see the above explanation with reference to FIG. 1. The following explains the battery control apparatus 400. The battery control apparatus 400 includes a plurality of batteries 401, a plurality of bypass circuits 402, a plurality of switches 403, a voltage detecting section 404, a current detecting section 405, a deterioration detecting section 406, and a switch control section 407.

The plurality of batteries 401 are connected in series. A battery circuit is constituted by the plurality of batteries 401 in serial connection. The battery circuit can also be referred to as "assembled battery." The plurality of bypass circuits 402 remove each of the plurality of batteries from the battery circuit. The plurality of switches 403 switch whether to connect the plurality of batteries 401 in series, or to connect them to the bypass circuits 402 to remove them from the battery circuit. The batteries 401 connected in series are connected to the battery circuit.

Specifically, the batteries 401 and the switches 403 are connected in series alternately, in such an order as the battery 401a, the switch 403a, the battery 401b, the switch 403b, . . . . Each of the batteries 401 and its corresponding bypass circuit 402 are connected in parallel via its corresponding switch 403. Accordingly, each switch 403 can switch whether to connect the corresponding battery 401 in series, or to connect the corresponding battery 401 to the bypass circuit to remove it from the battery circuit. Specifically, the switch 403a switches whether to connect the battery 401a in series, or to remove the battery 401a from the battery circuit. The switch 403b switches whether to connect the battery 401b in series, or to remove the battery 401b from the battery circuit.

The voltage detecting section 404 detects the voltage of each battery 401. In addition, the voltage detecting section 404 detects the voltage of the battery circuit. The voltage detecting section 404 outputs the voltage of each of the batteries 401 having been detected, to the deterioration detecting section 406 and the power shortage determining section 408. The current detecting section 405 detects the current of the battery circuit. That is, the current detecting section 405 detects the current flowing from the battery circuit. The current detecting section 405 outputs the detected current to the deterioration detecting section 406 and the power shortage determining section 408. The deterioration detecting section 406 detects the deterioration of each of the plurality of batteries 401. The deterioration detecting section 406 detects the deterioration of each battery 401, from at least one of the voltage and the current of each of the plurality of batteries 401. The deterioration detecting section 406 may detect, as the deterioration, at least one of the internal resistance value of the battery 401, the number of times of charge/discharge of the battery 401, the charge start voltage of the battery 401, the charge completion voltage of the battery 401, the charge curve of the battery 401, and the deterioration curve of the battery 401. The deterioration detecting section 406 may have the same function as that of the deterioration detecting section 115 shown in FIG. 1. In the present embodiment, the deterioration detecting section 406 detects the internal resistance value of the battery 401. The deterioration of the battery 401 detected by the deterioration detecting section 406 is outputted to the switch control section 407. The deterioration detecting section 115 outputs, to the switch control section 407, the deterioration value representing the detected degree of deterioration. If the internal resistance value is detected as the deterioration, the deterioration detecting section 406 may use the internal resistance value as the deterioration value as it is.

The switch control section 407 controls the plurality of switches 407. The switch control section 407 controls the switches 403 to remove batteries 401 having greater deterioration. This enables slowing the progress of the deterioration of all the batteries in the battery circuit as a whole, to improve the efficiency of the battery circuit as a whole. In addition, only batteries 401 having smaller deterioration will be connected in series in this configuration, which also helps slow the progress of the deterioration of the batteries 401.

When charging the batteries 401 having greater deterioration and the batteries 401 having smaller deterioration, which are connected in series, if the charging is conducted by referring to the batteries having greater deterioration, it prevents full charge of the batteries 401 having smaller deterioration. Conversely, if it is designed to conduct charging by referring to the batteries 401 having smaller deterioration, the batteries 401 having greater deterioration will result in overcharged state. In the case of discharge, too, when the discharge is conducted by referring to the batteries 401 having greater deterioration, the batteries 401 having smaller deterioration cannot be fully discharged. Conversely, when the discharge is conducted by referring to the batteries 401 having smaller deterioration, the batteries 401 having greater deterioration will result in overcharged state. In the conventional cases, if the batteries 401 having greater deterioration and the batteries 401 having smaller deterioration are connected in series, the speed of the deterioration of a battery circuit as a whole has become faster, to degenerate the efficiency as the battery circuit as a whole.

The switch control section 407 can connect in series, from among the plurality of batteries 401, the battery(ies) 401 whose difference in deterioration from a battery 401 having the smallest deterioration is a predetermined value or less, and remove the batteries 401 whose difference in deterioration from the battery 401 having the smallest deterioration exceeds the predetermined value, from the battery circuit. Specifically, battery(ies) 401 whose difference in internal resistance value from the battery 401 having the smallest internal resistance value of all the plurality of batteries 401 is a predetermined value or less are connected in series. Conversely, batteries 111 whose difference in internal resistance value from the battery 111 having the smallest internal resistance value of all the plurality of batteries 111 exceeds the predetermined value are removed from the battery circuit.

When the voltage of the battery circuit becomes a predetermined value or less, the switch control section 407 controls the switches 403 to connect, in series, the batteries 401 having been disconnected from the battery circuit. The remaining battery amount of the battery circuit is proportional to the voltage of the battery circuit. That is, when the voltage of the battery circuit is lowered, the remaining battery amount of the battery circuit also decreases. Therefore, when the voltage of the battery circuit becomes a predetermined value or less, the remaining battery amount of the battery circuit can be recovered by connecting, in series, the batteries 401 having been disconnected from the battery circuit.

The switch control section 407 controls the switches 403 to sequentially connect each of the plurality of batteries 401 in series, and to bring the batteries 401 other than the serially connected batteries 401, in the state removed from the battery circuit. Specifically, the switch control section 407 connects the switch 403a to the battery 401a side, and connects the other switches 403 to the bypass circuits 402. That is, the battery 401a is in serial connection, and the other batteries 401 are removed from the battery circuit. Next, the switch 403a is connected to the bypass circuit 402a, and the switch 403b is connected to the battery 401b. Here, the switches 403 other than the switch 403b are connected to the bypass circuits 402. In this situation, the battery 401b is in serial connection, and the other batteries 401 are removed from the battery circuit. In this way, each battery 401 is sequentially connected in series, and the batteries 401 other than the battery 401 in serial connection are removed from the battery circuit. In this example, because each battery 401 is sequentially connected to the battery circuit, the voltage detecting section 405, which detects the voltage of the battery circuit, can detect the voltage of each battery 401.

The switch control section 407 may perform the operation of sequentially connecting each of the plurality of batteries 401 to the battery circuit while removing the other batteries 401 from the battery circuit, at the charge start, the charge completion, the stopping of the vehicle 100, or the parking of the vehicle 100, to enable the voltage detecting section 405 to detect the voltage of each battery 401. The switch control section 407 may perform the operation of sequentially connecting each of the plurality of batteries 401 to the battery circuit while removing the other batteries 401 from the battery circuit, while the battery circuit is not supplying the power to the motor 103, or while the load such as a motor is being driven at a constant amount of power. The current detecting section 405 may detect the current of each battery 401. The number of rotation of the motor 103 changes in the elapse of time. Therefore, the amount of power supplied to the motor 103 changes accordingly. When the rotation number of the motor 103 is changing as time goes, the current detecting section 405 is unable to detect the accurate current of the battery 401. Therefore, it is desirable to detect the current of the battery 401 while no power is supplied to the load such as the motor 103. Here, it is desirable to detect the current by connecting a certain load (e.g., resistor) to the battery 401.

The power shortage determining section 408 determines whether there will be shortage in power supplied to a load from the battery circuit. The power shortage determining section 408 determines whether there will be shortage in power, by determining whether the power that can be supplied to the load from the battery circuit is greater than the amount of power consumed by the load. The load may be a motor 103 or an air conditioner for example. The power consumption of the motor 103 changes depending on the number of rotations. The power consumption of the air conditioner also changes depending on the temperature settings or the like. The power shortage determining section 408 may calculate the power consumed by the load, according to the level of acceleration, the temperature settings, or the like. The power shortage determining section 408 may obtain the power that can be supplied to the load from the battery circuit, based on at least one of the voltage of the battery circuit and the current flowing from the battery circuit. The power shortage determining section 408 may also obtain the power that can be supplied to the load from the battery circuit, based on at least one of the voltage of the battery 401 connected to the battery circuit and the current flowing from the battery 401. The voltage of each of the plurality of batteries 401 can be detected as stated above. The power shortage determining section 408 may have the same function as that of the power shortage determining section 117 shown in FIG. 1.

When there is a shortage in power supplied to the load from the battery circuit, the switch control section 407 may control the switches 403 to connect the batteries 401 having greater deterioration disconnected from the battery circuit, in series. Accordingly, the voltage of the battery circuit becomes higher, to increase the power supplied to the load from the battery circuit.

The following explains the operation of the vehicle 100 shown in FIG. 4. The switch control section 407 controls the switches 403 to remove the batteries 401 having greater deterioration from the battery circuit, and to connect the batteries 401 having smaller deterioration in series. Specifically, the switch control section 407 uses the deterioration value of the plurality of batteries 401 detected by the deterioration detecting section 406, to connect in series the batteries 111 whose difference in deterioration from a battery 111 having the smallest deterioration is a predetermined value or less, and to remove the batteries 401 whose difference in deterioration from the battery 111 having the smallest deterioration exceeds the predetermined value, from the battery circuit. This improves the efficiency of the battery circuit as a whole, and slows down the deterioration of the battery circuit. Moreover, the batteries 401 having greater deterioration can be removed from the battery circuit until their deterioration is at the level of the batteries 401 having smaller deterioration. Note that the switch control section 407 may perform the operation of controlling the switches 403 to remove the batteries 401 having greater deterioration from the battery circuit, as well as connecting, in series, the batteries 111 having smaller deterioration, at predetermined periods. In addition, the switch control section 407 may perform the operation at the start or the end of using the vehicle 100. By performing the mentioned operation periodically, when the deterioration of the batteries 401 having smaller deterioration becomes substantially the same as the deterioration of the batteries 401 having greater deterioration, due to the usage of the batteries 401 having smaller deterioration, the batteries 401 having greater deterioration will be connected to the battery circuit.

By using the batteries 401 having smaller deterioration, the voltage of the batteries 401 having the smaller deterioration is lowered. This also causes the voltage of the battery circuit to be lowered. When the voltage of the battery circuit becomes or falls below a predetermined value, the switch control section 407 controls the switches 403 to connect, in series, the batteries 401 having greater deterioration having been removed from the battery circuit. This helps raise the voltage of the battery circuit. Note that the switch control section 407 may connect, in series, the batteries 401 having greater deterioration and removed from the battery circuit, and remove, from the battery circuit, the batteries 401 having smaller deterioration and in serial connection. Note that when the batteries 401 having smaller deterioration are charged, the switch control section 407 can control the switches 403 to connect the batteries 401 having smaller deterioration again in series, while removing the batteries 401 having greater deterioration from the battery circuit.

In addition, for example when the power shortage determining section 408 determines that the power to be supplied to the load such as a motor 103 from the battery circuit will lack, the switch control section 407 controls the switches 403 to connect, in series, the batteries 401 having greater deterioration and removed from the battery circuit. Accordingly, the power shortage of the load can be resolved. Note that when the power of the batteries 401 having smaller deterioration are sufficient in supplying power to the load, the switch control section 407 controls the switches 403 to remove the batteries 401 having greater deterioration, from the battery circuit.

In addition, when the deterioration of the batteries 401 connected in series becomes substantially the same as the deterioration of the batteries 401 having greater deterioration and removed from the battery circuit, due to usage of the battery circuit, the switch control section 407 may control the switches 403 to connect, in series, the batteries 401 having greater deterioration.

The battery 401 may be a battery cell, or may be a battery module made by a plurality of battery cells in serial connection. The battery 401 may also be a battery circuit in which a plurality of batteries 111 are connected in parallel, as shown in FIG. 1. The battery 401 may include a plurality of switches 112 for disconnecting each of the plurality of batteries 111 in parallel connection, from the battery circuit. The battery 401 may also include a switch control section for controlling the switches 112. The battery 401 may be the battery control apparatus 101 shown in FIG. 1.

In addition, the battery 111 in FIG. 1 may be a battery circuit in which a plurality of batteries 401 are connected in series as shown in FIG. 4. The battery 111 may include bypass circuits 402 for removing each of the plurality of batteries 401 in serial connection, from the battery circuit. In addition, the battery 111 may include a plurality of switches 403 for switching whether to connect each of the plurality of batteries 401 in series, or to connect them to the bypass circuits 402 to remove them from the battery circuit. In addition, the battery 111 may include a switch control section 407 for controlling the plurality of switches 403.

Although explained to be provided in the vehicle 100 and the power generating apparatus 300, the battery control apparatus 101 may be provided in the other apparatuses. Although explained to be provided in the vehicle 100, the battery control apparatus 400 may be provided in the other apparatuses such as the power generating apparatus 300.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A battery control apparatus comprising:
    a battery circuit in which a plurality of batteries are connected in series;
    a plurality of bypass circuits, each bypass circuit operable to remove a corresponding one of the plurality of batteries from the battery circuit;
    a plurality of switches, each switch operable to switch a corresponding one of the plurality of batteries between the battery circuit and the corresponding bypass circuit;
    a deterioration detecting section operable to detect deterioration of each of the plurality of batteries;
    a voltage detecting section that detects a voltage of the battery circuit; and
    a switch control section operable to control the plurality of switches to remove, from the battery circuit, each battery having a difference in deterioration from the battery of the plurality of batteries having the smallest deterioration that exceeds a predetermined value, and reconnect each battery having a difference in deterioration from the battery of the plurality of batteries having the smallest deterioration that exceeds the predetermined value when the voltage of the battery circuit becomes a predetermined voltage or less.

2. The battery control apparatus according to claim 1, further comprising:
    a current detecting section that detects the current flowing from each of the plurality of batteries by detecting the current of the battery circuit,
    wherein the switch control section is operable to control the plurality of switches to sequentially connect each of the plurality of batteries in series, and to remove each battery other than the batteries connected in series, from the battery circuit, and
    wherein the deterioration detecting section detects deterioration of each battery from the current flowing from the battery.

3. A vehicle comprising:
    a battery circuit in which a plurality of batteries are connected in series;
    a plurality of bypass circuits, each bypass circuit operable to remove a corresponding one of the plurality of batteries from the battery circuit;
    a plurality of switches, each switch operable to switch a corresponding one of the plurality of batteries between the battery circuit and the corresponding bypass circuit;
    a deterioration detecting section operable to detect deterioration of each of the plurality of batteries;
    a voltage detecting section that detects a voltage of the battery circuit; and
    a switch control section operable to control the plurality of switches to remove, from the battery circuit, each battery having a difference in deterioration from the battery of the plurality of batteries having the smallest deterioration that exceeds a predetermined value, and reconnect each battery having a difference in deterioration from the battery of the plurality of batteries having the smallest deterioration that exceeds the predetermined value when the voltage of the battery circuit becomes a predetermined voltage or less.

4. A battery control method comprising:
    detecting deterioration of each of a plurality of batteries connected in series in a battery circuit; and
    controlling a plurality of switches, each switch operable to switch a corresponding one of the plurality of batteries between the battery circuit and a corresponding bypass circuit operable to remove the corresponding one of the plurality of batteries from the battery circuit, thereby removing, from the battery circuit, each battery having a difference in deterioration from the battery of the plurality of batteries having the smallest deterioration that exceeds a predetermined value, and reconnect each battery having a difference in deterioration from the battery of the plurality of batteries having the smallest deterioration that exceeds the predetermined value when the voltage of the battery circuit becomes a predetermined voltage or less.

5. The battery control apparatus according to claim 1, wherein the deterioration detecting section is operable to detect deterioration of each of the plurality of batteries by detecting an internal resistance of each of the plurality of batteries.

6. The battery control apparatus according to claim 1, wherein the deterioration detecting section is operable to detect deterioration of each of the plurality of batteries by detecting a number of times of charge/discharge of each of the plurality of batteries.

7. The battery control apparatus according to claim 1, wherein the deterioration detecting section is operable to detect deterioration of each of the plurality of batteries by detecting a charge start voltage of each of the plurality of batteries.

8. The battery control apparatus according to claim 1, wherein the deterioration detecting section is operable to detect deterioration of each of the plurality of batteries by detecting a charge completion voltage of each of the plurality of batteries.

9. The battery control apparatus according to claim 1, wherein the deterioration detecting section is operable to detect deterioration of each of the plurality of batteries by detecting a charge curve of each of the plurality of batteries.

10. The battery control apparatus according to claim 1, wherein the deterioration detecting section is operable to detect deterioration of each of the plurality of batteries by detecting a deterioration curve of each of the plurality of batteries.

* * * * *